A. WARREN.
DIES FOR CUTTING LEATHER.

No. 189,406.            Patented April 10, 1877.

WITNESSES:
E. Wolff
J. H. Scarborough

INVENTOR:
A. Warren
BY
ATTORNEYS.

UNITED STATES PATENT OFFICE

ALBERT WARREN, OF JEFFERSON, OHIO.

IMPROVEMENT IN DIES FOR CUTTING LEATHER.

Specification forming part of Letters Patent No. 189,406, dated April 10, 1877; application filed February 10, 1877.

*To all whom it may concern:*

Figure 1:
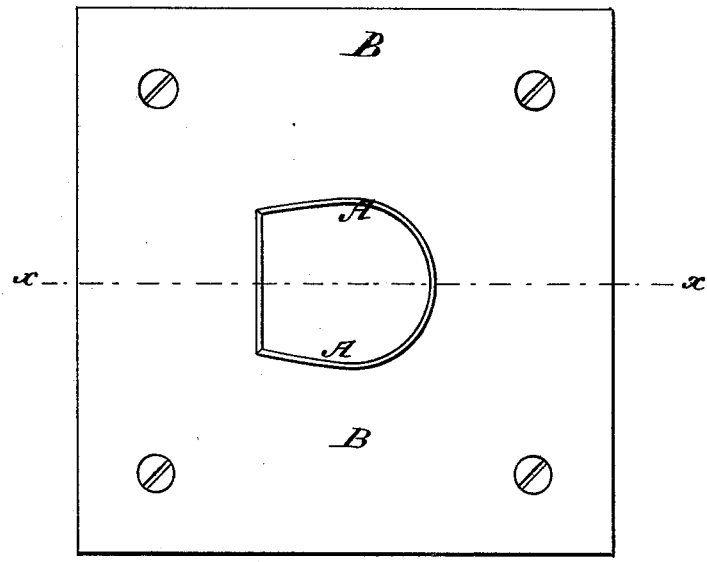
Figure 2:
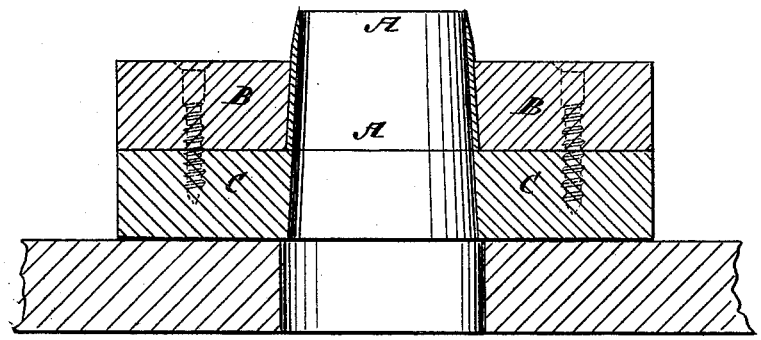

Be it known that I, ALBERT WARREN, of Jefferson, in the county of Ashtabula and State of Ohio, have invented a new and useful Improvement in Dies for Cutting Leather, &c., of which the following is a specification:

Figure 1 is a face view of one of my improved dies. Fig. 2 is a cross-section of the same, taken through the line $x\ x$, Fig. 1.

Similar letters of reference indicate corresponding parts.

The object of this invention is to furnish improved dies for cutting heels, soles, stiffening, &c., for boots and shoes, and for various other uses, which shall be so constructed as to require no cutting-block to receive dirt and dull the knife, which may be made of lighter steel, kept in order with less labor, and made with less expense than ordinary cutting-dies.

The invention will first be described in connection with the drawing, and then pointed out in the claim.

A is the die or cutter, which is made of steel, of the shape of the article to be cut, and a little smaller at its cutting end than at the other, so that the pieces cut may pass through it freely. The die A is fitted into a hole in a block of wood, B, so that its rear edge may be flush with the lower surface of the said block. C is a block of wood having a hole formed through it of the same shape as the cutter, and of a size exactly equal to the interior of the rear end of the die A. The block C is secured to the block B, by screws or other means, in such a way that the rear edge of the die A may rest upon the block C, around the hole through said block, so that the inner surface of the die A and block C may be continuous with each other.

In using the device, it is laid upon a table or counter, over a hole in said table or counter, for the pieces to drop through. The material to be cut is then laid upon the edge of the die A, and is struck with a wooden mallet. With this construction the whole force of the blow is expended in making the cut, as the die does not have to be moved by the force of the blow before it begins to cut. With this construction, also, the material can be more readily adjusted, as the body of the die is not in the way to obstruct the sight, and there is no trouble in removing the pieces, as the form of the die allows them to drop through readily.

I am aware that it is not broadly new to use a die on which leather is cut by impact or pressure; but

What I claim is—

The combination, in a die-holder, of the die A and blocks B C, each of the latter provided with a central aperture to allow the cut stock to drop through, and the lower block C constituting the base-support for the die, all constructed and arranged substantially as shown and described.

ALBERT WARREN.

Witnesses:
 E. J. BETTS,
 CORA E. BAILEY.